Patented June 26, 1945

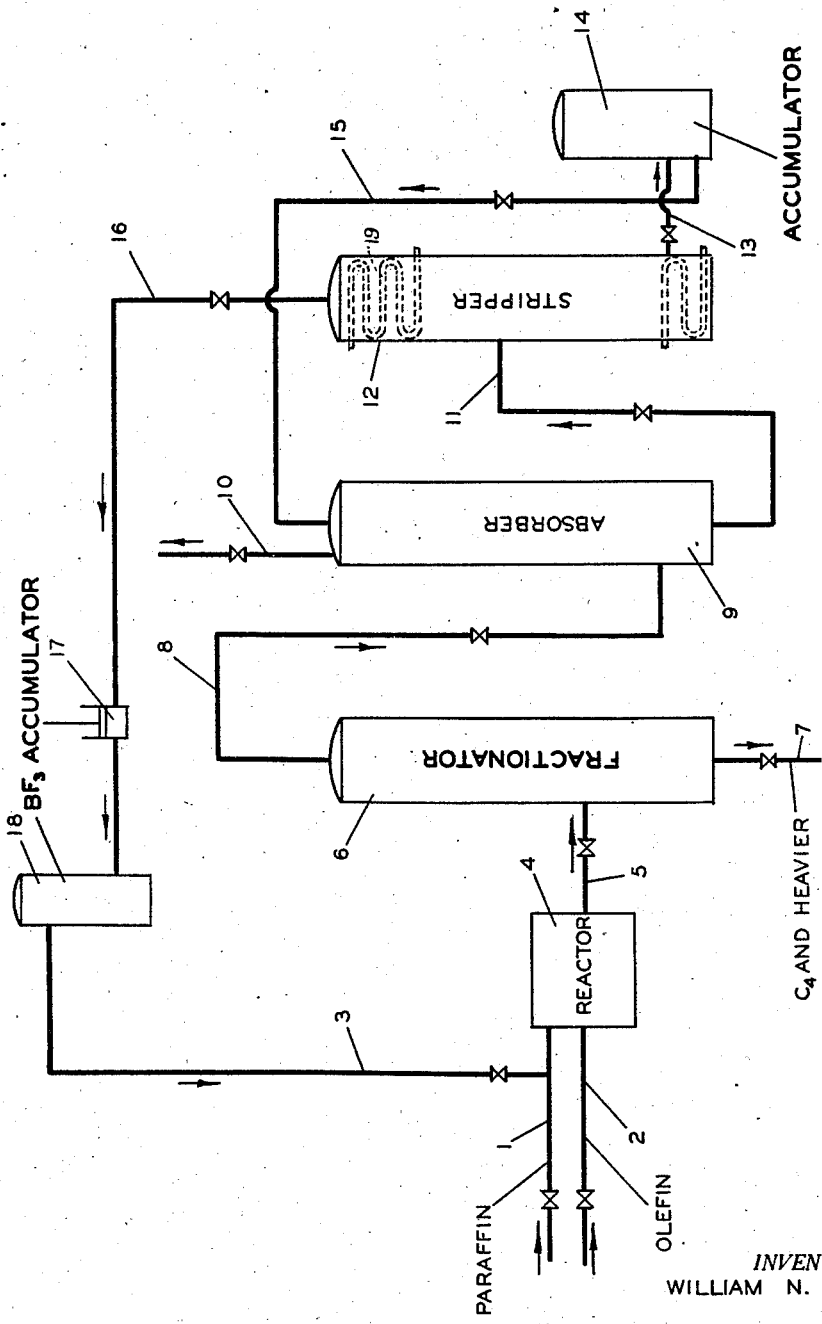

2,378,968

UNITED STATES PATENT OFFICE 2,378,968

BORON FLUORIDE RECOVERY PROCESS

William N. Axe, Bartlesville, Okla., assignor to Phillips Petroleum Company, a corporation of Delaware Application December 5, 1942, Serial No. 468,017

13 Claims. (Cl. 23—205)

This invention relates to an improved method for the concentration and recovery of boron halides. In one modification this invention relates to the recovery of boron fluoride from hydrocarbons and mixtures of hydrocarbon and inert gases. In a more specific modification this invention relates to an improved process for the absorption of boron fluoride from a hydrocarbon gas stream followed by subsequent recovery of substantially pure boron fluoride from the absorbent.

Recently it has been discovered that boron fluoride and coordination compounds of boron fluoride possess unusual catalytic activity when applied to a wide variety of polymerization, isomerization and alkylation reactions. Industrial dedevelopment of the catalytic potentialities of boron fluoride has been slow, both because of the high initial catalyst cost and because of the loss of gaseous boron fluoride encountered in said reactions. Even more recently it has been discovered that exceptional catalyst life in alkylation and other reactions can be realized by the continuous activation of boron fluoride complex compounds with gaseous boron fluoride. Such processes embody novel and improved methods for producing valuable materials such as high octane blending agents for aviation fuel.

The chemical activity of boron fluoride is well known and its removal from gaseous or liquid hydrocarbon streams by means of aqueous alkaline solutions and the like is ordinarily a relatively simple operation. However, the recovery of boron fluoride from the resultant compounds and solutions, represents a serious problem. It has been proposed, for example, to employ ammonia and amines as agents for the recovery of boron fluoride. However, the ammonia-boron fluoride reaction product is an exceedingly stable compound requiring the employment of 100 per cent sulfuric acid and temperatures of about 410° F. for liberation of the boron fluoride. The disadvantages of such a process of boron fluoride recovery are apparent on consideration of the unit operations required where aqueous ammonia is employed. The wash solution must be concentrated, the resultant $NH_3 \cdot BF_3$ precipitate must be rendered bone-dry, and finally the dried complex must be decomposed at relatively high temperatures with concentrated or fuming sulfuric acid. Other recovery methods have been proposed all of which involve the formation of stable compounds which then require the installation of expensive equipment, unsuited to continuous operation, for the ultimate regeneration of the boron fluoride.

An object of my invention is to recover boron fluoride.

It is also an object of the present invention to effect efficient and economical recovery of boron fluoride from hydrocarbon streams.

Another object of this invention is to provde a process whereby boron fluoride can be continuously recovered from effluent streams of hydrocarbons from reactions of the type described and returned to the reaction zone without appreciable loss of boron fluoride or consumption of chemicals.

A further object of the invention is to provide new compositions of matter.

These and other objects will be apparent from the accompanying disclosure and discussion.

I have discovered that certain organic sulfurcontaining compounds are capable of forming coordination compounds with boron fluoride at substantially atmospheric temperature to form combinations containing approximately one mol of $BF_3$ per mol of absorbent. I have also discovered that the complex compounds formed between boron fluoride and the aforesaid organic sulfur compounds decompose at moderately elevated temperatures to afford substantially complete recovery of the constituent compounds. The organic sulfur-containing compounds of this invention may be selected from a group corresponding to the following type formula:

where R′ may be either an alkyl or aryl radical with or without substituents other than hydrogen and R″ may be hydrogen or an alkyl radical with or without substituents other than hydrogen. The compound, or compounds, used should either be liquid at the absorption temperature or soluble in substantial amounts in suitable liquid material, such as a hydrocarbon fraction. Generally it will be satisfactory to use a compound in which neither R′ nor R″ contains more than about seven carbon atoms.

Alkyl sulfides and mercaptans combine with boron fluoride at moderate temperatures of from about 40 to 100° F. to form loose addition compounds containing one mol of boron fluoride per mol of sulfide or mercaptan. The boron fluoride addition comounds with the aforementioned sulfides and mercaptans can be decomposed by the simple application of heat. Ordinarily complete decomposition into the constituent compounds is realized at temperatures of about 150 to about 300° F., although variations from these limits may occur depending on the particular sulfur-containing compound employed, the pressure and the degree of saturation of the absorbent liquid.

The boron fluoride recovery process of this invention is particularly adaptable to alkylation processes. Thus, in cases where boron fluoride complex compounds are employed as catalysts, the effluent hydrocarbon stream from the reactor may contain from about 0.5 to 2.0 or more per cent by weight of free boron fluoride depending on the catalyst composition and the reaction conditions. In actual plant operation appreciable quantities of methane, ethane and propane may be present in the feed stocks and therefore will have to be removed from the reactor effluent. Since boron fluoride boils intermediate between methane and ethane, the pressure stabilizer may be so operated that fixed gases, methane, ethane, propane and boron fluoride are removed in one operation leaving the C₄ and higher hydrocarbons substantially free of boron fluoride. The overhead light gases may then be contacted in a suitable countercurrent operation with a selected alkyl sulfide or mercaptan to absorb the boron fluoride from the gas stream. Boron fluoride is subsequently removed from the absorbing liquid in a stripping column operated at a temperature level sufficient to effect decomposition of the boron fluoride complex at a satisfactory rate. The gaseous boron fluoride is then compressed and returned to the alkylation system.

A specific embodiment of the process is illustrated in the flow diagram which shows an arrangement of equipment for the continuous recovery of boron fluoride in connection with an alkylation process. A selected isoparaffin feed mixed with boron fluoride is introduced into the reaction vessel 4 through line 1. Simultaneously, an olefin-containing hydrocarbon fraction is fed to the reactor through line 2 in controlled molar proportions, and the hydrocarbon reactants are contacted in reactor 4 with a catalyst containing boron fluoride. The effluent hydrocarbon mixture from the reactor, containing minor quantities of propane and lighter hydrocarbons usually associated with the feed stocks and boron fluoride dissolved in alkylate and excess isoparaffin, is fed into a fractionating column 6 through line 5. The C₃ and lighter hydrocarbons and boron fluoride are removed as gases through line 8 while the C₄ and heavier hydrocarbons constituting the kettle product are removed through line 7 for further stabilization. The boron fluoride-containing gases are fed into the bottom of absorber 9 and the boron fluoride is removed by a descending stream of alkyl sulfide, such as n-butyl sulfide. The halide-free gases are removed through line 10 while the boron fluoride-alkyl sulfide compound dissolved in excess sulfide flows through line 11 to stripping column 12 where sufficient heat is applied to decompose the complex. Hot alkyl sulfide is removed through line 13 and through a cooler (not shown) to storage tank 14. A partial condenser 19 is employed to prevent the loss of absorbent in the BF₃ taken overhead through line 16. The low-pressure boron fluoride is compressed to the reactor working pressure by compressor 17 and stored in tank 18, from which boron fluoride is returned to the reactor via line 3.

Absorbents found to be applicable in removing boron fluoride according to this process have been the alkyl sulfides and mercaptans. These compounds readily combine with one molecular proportion of boron fluoride. Boron fluoride is substantially completely regenerated from such complex compounds at or below the boiling temperature of the pure absorbent. In the case of the higher sulfides and mercaptans complete decomposition of the complex at atmospheric pressure can be obtained at temperatures not higher than about 850° F., and in most instances temperatures of about 150–220° F. are adequate.

Although it is advantageous to operate the recovery process with relatively pure compounds, mixtures of high and low molecular weight sulfides and/or mercaptans may be satisfactorily employed. Furthermore, mixtures of sulfides and mercaptans are operable. While the absorbents may contain relatively inert impurities or diluents it is preferred to employ compounds or mixtures relatively free of alcoholic impurities. Thus, methyl and ethyl alcohols form relatively heat-stable complex compounds with boron fluoride while the higher alcohols tend to form high-molecular weight polymers.

In actual operation of this process, complete stoichiometric saturation of the sulfide and/or mercaptan absorbents is not necessary and in many instances may be undesirable. Where the concentration of BF₃ in the gas stream is about 10 weight per cent or less, incomplete saturation of the absorbent may be desirable in order to favor complete absorption of the boron fluoride.

Absorber pressures are chosen in accordance with the composition of the gas stream. For streams rich in C₃ hydrocarbons the pressure may vary from atmospheric to about 100 pounds gage, while for streams rich in methane and ethane pressures as high as 500 pounds gage may be employed. In order to prevent excessive accumulation of hydrocarbons in the sulfide or mercaptan, gas-liquid contacting is preferred and pressures are necessarily regulated to maintain this condition. In the stripping zone, low super-atmospheric pressures are ordinarily employed which enable the desorption of boron fluoride at moderate temperatures without, however, incurring losses of the absorbing liquid. In come cases, sub-atmospheric pressures may be feasible.

The following exemplary operations will serve to illustrate specific procedures in carrying out the process of this invention. The examples are not, however, necessarily to be construed as limitations on the practice of the invention.

*Example I*

The following compounds were treated with gaseous boron fluoride until completely saturated at a temperature of 70° F.:

| Compound | Mols BF₃/mol of cpd. |
| --- | --- |
| Ethyl sulfide | 1 |
| n-Propyl sulfide | 1 |
| Iso-propyl sulfide | 1 |
| n-Butyl sulfide | 1 |
| n-Amyl sulfide | 1 |
| Methyl disulfide | 0 |
| n-Butyl mercaptan | 1 |
| Amyl mercaptan | 1 |
| Benzyl mercaptan | 1 |

The reaction products obtained from boron fluoride and the preceding sulfur compounds were fuming mobile liquids at atmospheric temperature and pressure. Complete decomposition with substantially complete boron fluoride recovery was realized on heating the reaction products to temperatures in the range of 150 to 250° F.

*Example II*

Normal butylsulfide was saturated with boron fluoride at 70° F. Approximately 1 mol of BF₃ was absorbed per mol of sulfide to give a red fuming liquid. On gradually heating the complex to 200° F., 95 weight per cent of the boron fluoride was evolved. A series of absorption and desorption runs was carried out on the same sample of sulfide with complete recovery of boron fluoride in all runs subsequent to the initial treatment.

*Example III*

A gas stream containing 90 per cent ethane and 10 per cent boron fluoride was separated from the effluent of an isobutane-ethylene alkylation reaction carried out in the presence of a catalyst activated with boron fluoride. This gas mixture was introduced at atmospheric pressure into the bottom of a packed column countercurrent to a descending stream of n-butyl sulfide. Complete absorption of boron fluoride was obtained. The liquid taken from the column showed the n-butyl sulfide to be about 50 per cent saturated with respect to boron fluoride. Desorption of the boron fluoride-rich absorbent resulted in more than 95 per cent recovery of substantially pure boron fluoride when the absorbent was heated to 205° F.

It will be readily appreciated that various modifications of my invention may be practiced, in the light of the disclosure, without departing from the spirit of the disclosure or from the scope of the claims.

I claim:

1. A process for recovering boron fluoride in concentrated form from a gaseous mixture containing boron fluoride and substantial amounts of other components, which comprises passing such a mixture into contact with a liquid comprising a sulfur compound of the type R'—S—R'' where R' is one of the group consisting of alkyl and aryl radicals and R'' is one of the group consisting of hydrogen and alkyl radicals, whereby a complex of said compound and boron fluoride is formed, removing the resulting rich liquid absorbent to a stripping zone, heating said liquid in said stripping zone to a temperature sufficient to decompose said complex forming boron fluoride, and recovering boron fluoride from said stripping zone.

2. A process for recovering boron fluoride from a mixture containing boron fluoride and substantial amounts of other components substantially inert under the conditions of use, which comprises passing such a mixture into contact with an organic sulfur compound of the type R'—S—R'' where R' is one of the group consisting of alkyl and aryl radicals and R'' is one of the group consisting of hydrogen and alkyl radicals, under conditions effecting formation of a complex of said compound and boron fluoride, separating said complex from said other components, and heating said complex to a temperature sufficient to decompose same thus forming boron fluoride.

3. A process which comprises passing a gaseous mixture containing boron fluoride and other gases substantially inert under the conditions of use into contact with a liquid comprising an organic sulfur compound of the type R'—S—R'' where R' is one of the group consisting of alkyl and aryl radicals and R'' is one of the group consisting of hydrogen and alkyl radicals, at a temperature below the decomposition temperature of the resultant boron fluoride-organic sulfur compound complex, for such a time and in such quantities as to effect substantially complete reaction of said boron fluoride with said organic sulfur compound by formation of a complex therebetween, and separating from contact with said liquid said other gases substantially free from boron fluoride.

4. A process which comprises heating a complex between boron fluoride and an organic sulfur compound of the type R'—S—R'' where R' is one of the group consisting of alkyl and aryl radicals and R'' is one of the group consisting of hydrogen and alkyl radicals, to a temperature sufficient to decompose said complex and form boron fluoride and said organic sulfur compound.

5. A process which comprises reacting boron fluoride with an organic sulfur compound of the type R'—S—R'' where R' is one of the group consisting of alkyl and aryl radicals and R'' is one of the group consisting of hydrogen and alkyl radicals, in equimolecular proportions at a temperature below the decomposition temperature of the resultant compound, and recovering the resultant compound which is a mobile fuming liquid at atmospheric temperatures and pressures and is readily decomposable by heat to produce free boron fluoride and free organic sulfur compound.

6. A process which comprises reacting boron fluoride with a butyl sulfide in equimolecular proportions at a temperature below the decomposition temperature of the resultant compound, to form a liquid complex readily decomposable at a temperature within the range of about 150 to about 250° F.

7. A process which comprises reacting boron fluoride with an amyl sulfide in equimolecular proportions at a temperature below the decomposition temperature of the resultant compound, to form a liquid complex readily decomposable at a temperature within the range of about 150 to about 250° F.

8. A process which comprises reacting boron fluoride with a butyl mercaptan in equimolecular proportions at a temperature below the decomposition temperature of the resultant compound, to form a liquid complex readily decomposable at a temperature within the range of about 150 to about 250° F.

9. A composition of matter comprising an essentially pure complex resulting from reacting boron fluoride with an equimolar quantity of an organic sulfur compound of the type R'—S—R'' where R' is one of the group consisting of alkyl and aryl radicals and R'' is one of the group consisting of hydrogen and alkyl radicals, said complex being a mobile fuming liquid at atmospheric temperatures and pressures, and readily decomposable by heat to produce free boron fluoride and free organic sulfur compound above-described.

10. A composition of matter as defined in claim 9 in which each said alkyl and aryl radical contains not more than seven carbon atoms.

11. A composition of matter comprising the complex resulting from reacting boron fluoride with an equimolar quantity of a butyl mercaptan, said complex being a mobile fuming liquid at atmospheric temperatures and pressures, and readily decomposable at a temperature within the range of about 150 to about 250° F. to produce free boron fluoride and free butyl mercaptan.

12. A composition of matter comprising the complex resulting from reacting boron fluoride with an equimolar quantity of a butyl sulfide, said complex being a mobile fuming red liquid at atmospheric temperatures and pressures, and readily decomposable at a temperature within the range of about 150 to about 250° F. to produce free boron fluoride and free butyl sulfide.

13. A composition of matter comprising the complex resulting from reacting boron fluoride with an equimolar quantity of an amyl sulfide, said complex being a mobile fuming liquid at atmospheric temperatures and pressures, and readily decomposable at a temperature within the range of about 150 to about 250° F. to produce free boron fluoride and free amyl sulfide.

WILLIAM N. AXE.